April 4, 1950 G. O. CONNER 2,503,029
FORMING MACHINE
Filed Aug. 8, 1947 3 Sheets-Sheet 1
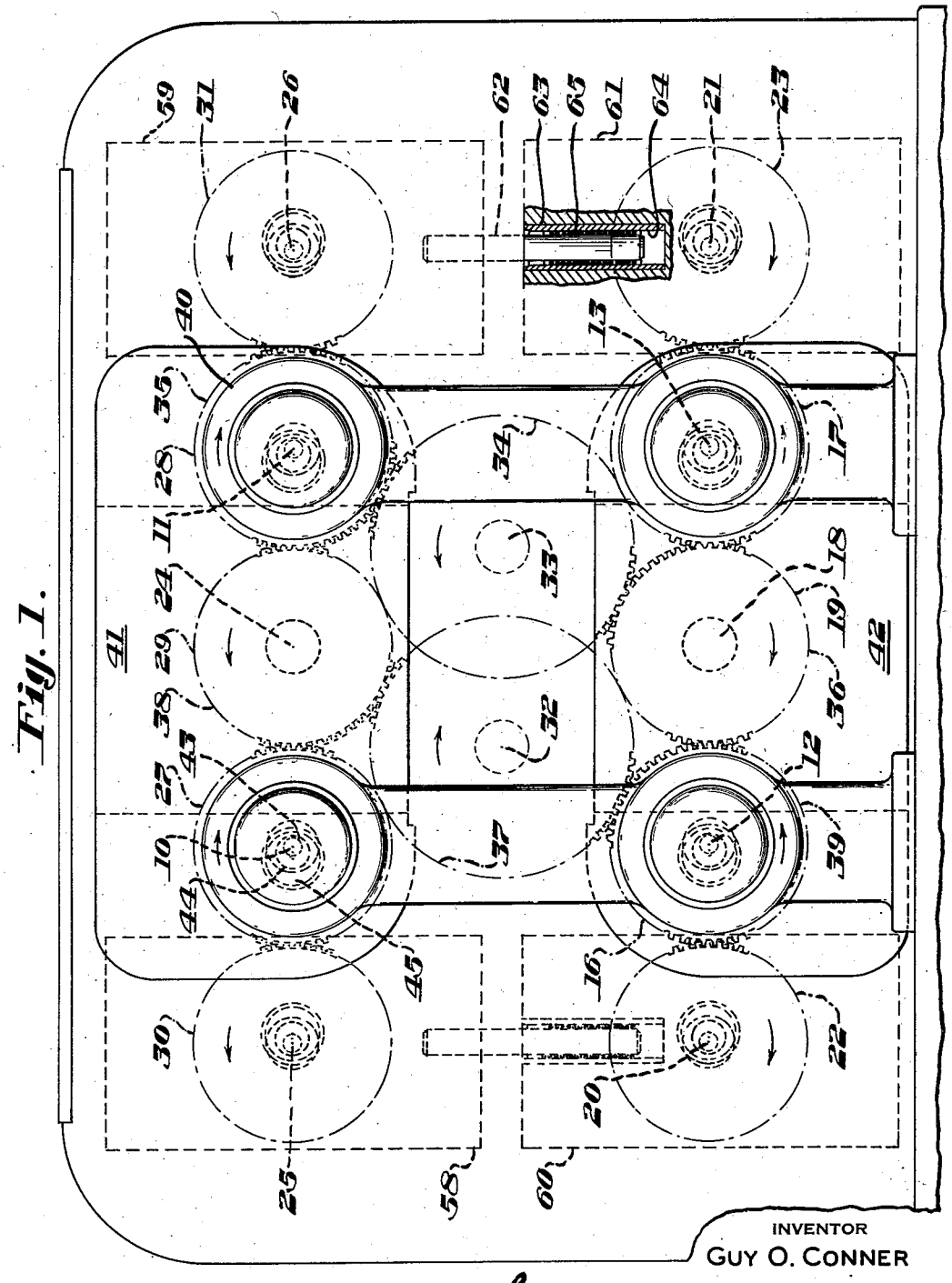
INVENTOR
GUY O. CONNER

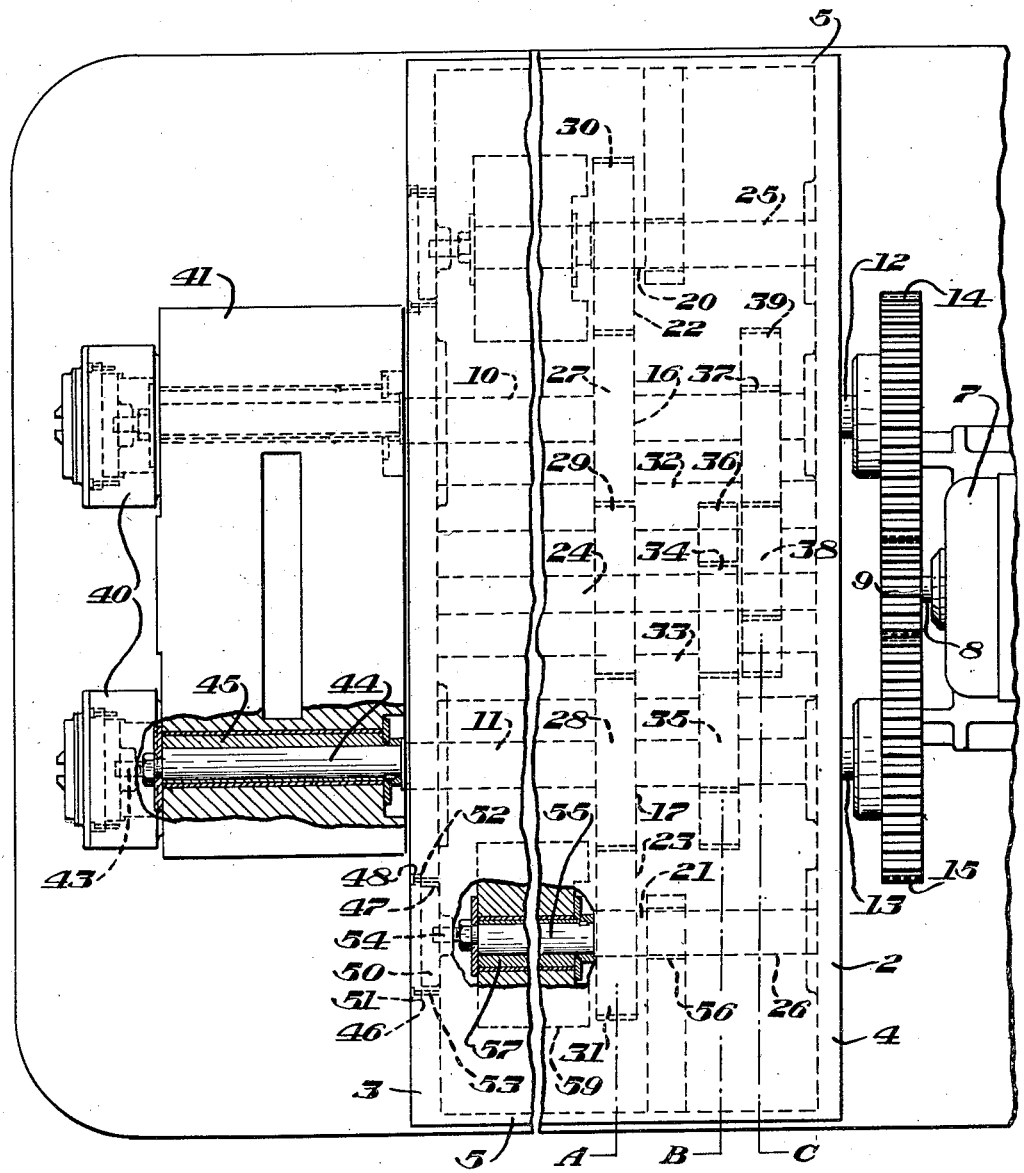

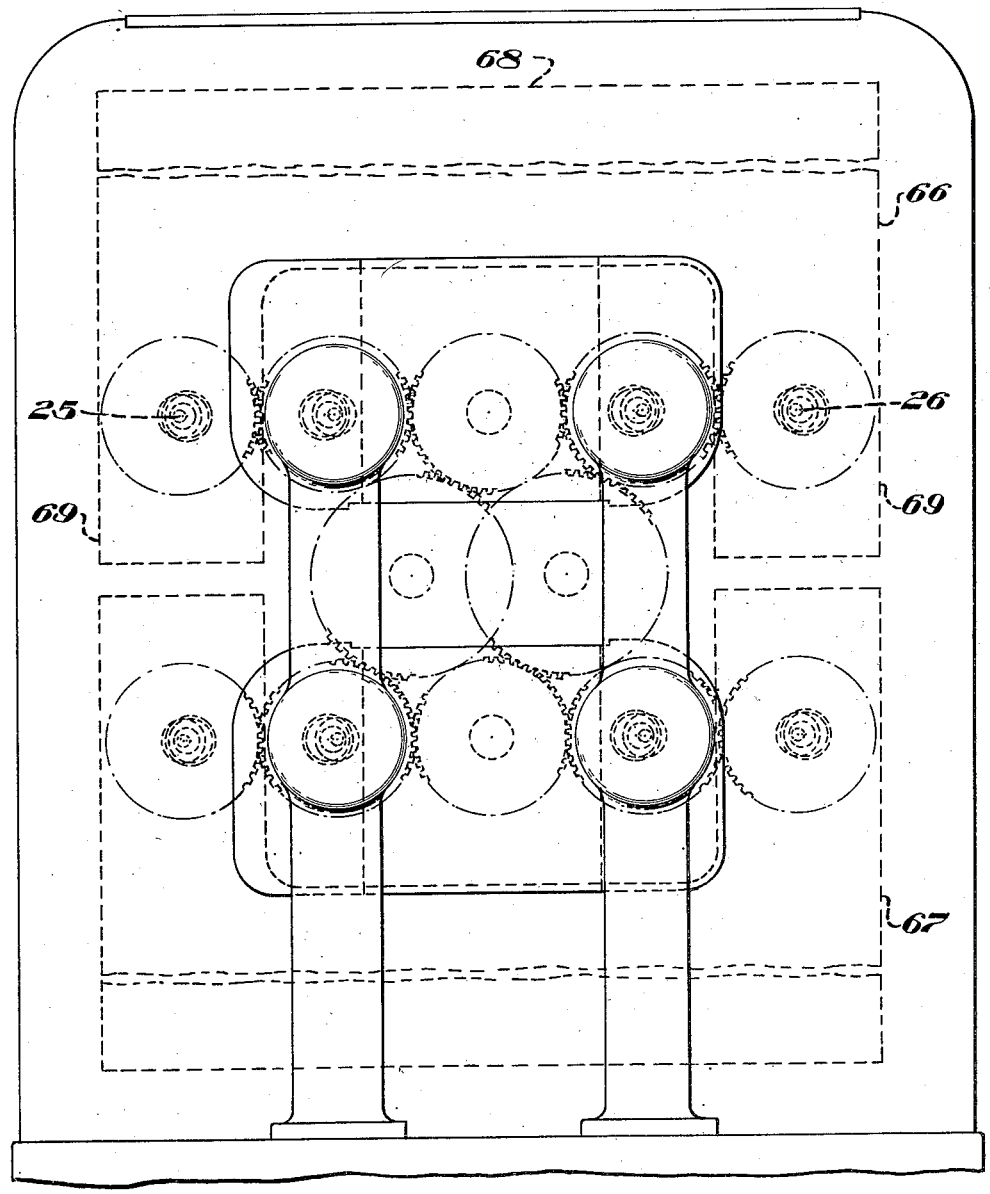

Patented Apr. 4, 1950

2,503,029

UNITED STATES PATENT OFFICE 2,503,029

FORMING MACHINE

Guy O. Conner, Cleveland Heights, Ohio

Application August 8, 1947, Serial No. 767,608

30 Claims. (Cl. 74—603)

This invention relates to forming machines and particularly to the counterbalancing of cyclically movable heads in forming machines. The invention relates particularly to a novel arrangement of counterweight means whereby new and useful results are obtained.

While my invention is broadly applicable to forming machines (e. g., machines for stamping, die forming, plastic molding, ceramic molding, extrusion, printing, etc.) employing cyclically movable heads which require counterbalancing for satisfactory high speed operation, the invention has especial utility in connection with Conner type machines such as those disclosed in my issued patents, for example, Patents Nos. 2,406,808 and 2,407,254. Purely for purposes of explanation and illustration the invention will be described as embodied in a Conner type forming machine.

A forming machine to which my invention is applicable may comprise opposed cyclically movable heads which move with substantially fixed orientation, the heads moving toward and away from each other and when closest together moving also laterally generally in the same direction. For satisfactory high speed operation the heads should be counterbalanced. I have heretofore disclosed the counterbalancing of the heads of such forming machines by application to the shafts upon which the heads are mounted of counterweights which are mounted on the shafts in such manner as to counterbalance the unbalanced forces created by movement of the heads during operation of the machine.

At times it may be undesirable to mount the counterweights on the shafts upon which the heads are mounted. For example, in machines for the performance of particular work it may be desired to maintain at a minimum the axial distance between bearings of the head carrying shafts; it may be desired to dispose the bearings immediately adjacent the front and rear faces of the heads. This cannot be done if the counterweights are mounted on the same shafts between the same bearings. If a bearing is interposed between a head and its counterweight the problem of adjustment of the throw of the counterweights immediately becomes acute as the counterweight eccentrics are disposed in relatively inaccessible positions.

I have discovered that the problem may be solved and satisfactory operation obtained by mounting the counterweights on shafts other than the shafts upon which the heads are mounted. If proper angular relationship between the heads and the counterweights is maintained the counterweights will be properly effective for counterbalancing the heads even though they are mounted on shafts other than the shafts upon which the heads are mounted. Preferably the counterweight shafts are laterally offset from the heads to provide for access to the eccentrics on the counterweight shafts to facilitate their adjustment.

I find it desirable to mount the counterweights on opposite sides of a frame member from the heads. Both the head carrying shafts and the counterweight shafts may be journaled in that frame member. Such a structure is of especial utility because the bearings for the head carrying shafts in the frame member and the outboard bearings for the ends of the head carrying shafts need be spaced apart a distance only slightly greater than the axial dimension of the heads. Provision may be made for access to the eccentrics on the counterweight shafts for purposes of replacement or adjustment by providing an opening or openings in the frame member in axial alignment with the counterweight shaft or shafts. I prefer to provide a removable bearing for an end of each counterweight shaft, which bearing may be mounted in an opening in the frame member and fastened in place from the head side of the frame and removable from the head side of the frame. Thus the eccentric means on each counterweight shaft may readily be exposed for adjustment or replacement through the opening in the frame member.

My invention is applicable to forming machines having either one or two generally orbitally movable heads. There should be at least one counterweight for each such head. There may be a plurality of counterweights for each such head. Each head and each counterweight may be mounted on one or more shafts. If a head or counterweight is mounted on only one shaft provision should be made for restraining it against turning. Opposed counterweights may be guided relatively to each other to maintain their orientation while being movable toward and away from each other.

Other details, objects and advantages of the invention will become apparent as the following description of certain present preferred embodiments thereof proceeds.

In the accompanying drawings I have shown certain present preferred embodiments of the invention, in which Figure 1 is a front elevational view of a forming machine with a portion in vertical cross-section;

Figure 2 is a top plan view of the forming machine shown in Figure 1 with portions in horizontal cross-section; and Figure 3 is a view similar to Figure 1 showing a modified construction.

Referring first to the structure shown in Figures 1 and 2, there is disclosed a forming machine having a frame designated generally by reference numeral 2 comprising a front frame member 3, a rear frame member 4 and side frame members 5. The frame 2 is mounted upon a base 6. Also mounted upon the base 6 is an electric motor 7 having a shaft 8 to which is keyed a driving pinion 9.

Journaled in the frame 2 are four head-carrying shafts 10, 11, 12 and 13, respectively. The shafts 10, 11, 12 and 13 are all parallel to each other and in the structure shown have their axes horizontal. The axes of the shafts 10 and 11 lie in the same horizontal plane. The axes of the shafts 12 and 13 lie in another horizontal plane below the horizontal plane containing the axes of the shafts 10 and 11. The axes of the shafts 10 and 12 lie in the same vertical plane and the axes of the shafts 11 and 13 lie in the same vertical plane. By means now to be described the shafts 10, 11, 12 and 13 are rotated simultaneously at the same speed, the shafts 10 and 11 in one direction and the shafts 12 and 13 in the opposite direction.

The shafts 12 and 13 project rearwardly through the frame member 4 and carry gears 14 and 15 respectively, the gears 14 and 15 being of the same diameter and both meshing with the driving pinion 9. Thus the shafts 12 and 13 are through the driving pinion 9 and the gears 14 and 15 driven so as to turn in the same direction at the same speed.

In the frame 2 are disposed three trains of gears disposed respectively in parallel planes designated by the letters A, B and C in Figure 2. In plane A gears 16 and 17 are keyed respectively to the shafts 12 and 13. Journaled in the frame 2 is an idler shaft 18 whose axis is in the same horizontal plane as the axes of the shafts 12 and 13. Keyed to the shaft 18 in plane A is a gear 19 which meshes with the gears 16 and 17.

Also journaled in the frame 2 with their axes in the same horizontal plane as the axes of the shafts 12, 13 and 18 are two counterweight shafts 20 and 21 respectively. Keyed respectively to the shafts 20 and 21 in plane A are gears 22 and 23. The gear 22 meshes with the gear 16 and the gear 23 meshes with the gear 17.

Journaled in the frame 2 respectively above the shafts 18, 20 and 21 are shafts 24, 25 and 26. The shaft 24 is, like the shaft 18, an idler shaft. The shafts 25 and 26 are, like the shafts 20 and 21, counterweight shafts. The axes of the shafts 10, 11, 24, 25 and 26 lie in the same horizontal plane. The axes of the shafts 20 and 25 lie in the same vertical plane. The axes of the shafts 18 and 24 lie in the same vertical plane. The axes of the shafts 21 and 26 lie in the same vertical plane. Keyed respectively to the shafts 10, 11, 24, 25 and 26 in plane A are gears 27, 28, 29, 30 and 31. The gear 29 meshes with the gears 27 and 28. The gear 30 meshes with the gear 27 and the gear 31 meshes with the gear 28. All of the gears 16, 17, 19, 22, 23, 27, 28, 29, 30 and 31 are of the same diameter. Hence the horizontal spacing between the axes of the shafts of each adjacent pair of shafts 12, 13, 18, 20 and 21 is the same and the horizontal spacing between the axes of the shafts of each adjacent pair of shafts 10, 11, 24, 25 and 26 is likewise the same.

Journaled in the frame 2 are two intermediate shafts 32 and 33. Keyed to the shaft 33 in plane B is a gear 34 of somewhat greater diameter than the gears 16, 17, 19, 22, 23, 27, 28, 29, 30 and 31. Keyed to the shaft 11 in plane B is a gear 35 of the same diameter as the gear 28. The gear 35 meshes with the gear 34. Keyed to the shaft 18 in plane B is a gear 36 of the same diameter as the gear 19. The gear 36 meshes with the gear 34.

Keyed to the shaft 32 in plane C is a gear 37 of the same diameter as the gear 34. Keyed to the shaft 24 in plane C is a gear 38 of the same diameter as the gear 29. The gear 38 meshes with the gear 37. Keyed to the shaft 12 in plane C is a gear 39 of the same diameter as the gear 16. The gear 39 meshes with the gear 37.

The gearing above described causes the shafts 12 and 13 to rotate in one direction at the same speed and the shafts 10 and 11 to rotate in the opposite direction at that same speed. With reference to Figure 1, if, for example, shafts 12 and 13 are rotated in the counterclockwise direction shafts 10 and 11 will rotate in the clockwise direction. The counterweight shafts 20 and 21 will rotate in the clockwise direction and the counterweight shafts 25 and 26 will rotate in the counterclockwise direction. The only shafts which project through the front frame member 3 are the head carrying shafts 10, 11, 12 and 13. The idler shafts 18 and 24, the intermediate shafts 32 and 33 and the counterweight shafts 20, 21, 25 and 26 are journaled entirely in the frame 2 and do not project therefrom.

Outboard bearings 40 are provided for journaling the ends of the projecting head-carrying shafts 10, 11, 12 and 13. The shafts 10 and 11 carry between the frame member 3 and the outboard bearings 40 an upper working head 41. The shafts 12 and 13 similarly carry a lower working head 42. Each of the shafts 10, 11, 12 and 13 has an extremity 43 which is journaled in the outboard bearing and an eccentric portion 44 between the extremity 43 and the frame member 3. Mounted upon the eccentric portion 44 of each of the shafts 10, 11, 12 and 13 is an eccentric sleeve 45. The purpose of providing the eccentric sleeve 45 is to make possible adjustment of the throw or amplitude of orbital movement of the heads. The respective eccentric sleeves 45 may be adjusted on the respective eccentric portions 44 of the shafts to provide for the desired amplitude of movement of the heads. Since the specific means for adjusting the amplitude of movement of the heads does not constitute the present invention such means is not here described in detail. Adjusting mechanism such as that disclosed in my copending application Serial No. 611,031 may be employed.

Each eccentric shaft portion 44 and eccentric sleeve 45 constitute together a compound or composite eccentric on the shaft. The shafts are so relatively angularly arranged that the high points of the respective eccentric portions 44 of all of the shafts extend in the same direction and the eccentric sleeves 45 are so arranged on the eccentric shaft portions 44 that the high points of the composite eccentrics extend in the same direction from the respective shafts. Thus the heads 41 and 42 partake of orbital movement in opposite directions, moving toward and away from each other and when closest together moving laterally in the same direction and at the same speed. Suitable dies are mounted on the heads for operating upon work which may be fed through the machine. No dies are shown in the drawings because the present invention is not limited to the use of any particular dies or the performance of any particular type of operation, being concerned only with the counterbalancing of the heads.

The frame member 3 has four circular openings 46, all of which are the same so that description of one will suffice for all four. Each opening 46 has an inner portion 47 of relatively small diameter and an outer portion 48 of relatively great diameter. The respective openings 46 are coaxial with the respective counterweight shafts 20, 21, 25 and 26. Adapted to fit within each of the openings 46 is a removable bearing member 49 having a body 50 and a flange 51. The body 50 of each bearing member 49 is adapted to fit within the portion 47 of the opening with the flange 51 lying against the shoulder 52 formed between the portions 47 and 48 of the opening. Screws 53 pass through the flange 51 and thread into the frame member 3 to hold the removable bearing members 49 in place.

Each of the counterweight shafts 20, 21, 25 and 26 has an extremity 54 which is journaled in the portion 50 of the corresponding bearing 49 and an eccentric portion 55 between the extremity 54 and a support bearing 56, the gear 22, 23, 30 or 31, as the case may be, being disposed between the eccentric portion 55 and the support bearing 56. Mounted upon the eccentric portion 55 of each of the shafts 20, 21, 25 and 26 is an eccentric sleeve 57. The purpose of providing the eccentric sleeves 57 is to make possible adjustment of the throw or amplitude of orbital movement of the counterweights. Mounted on each of the eccentric sleeves 57 is a counterweight, there being four counterweights 58, 59, 60 and 61. The counterweight 58 is carried by the shaft 25, the counterweight 59 is carried by the shaft 26, the counterweight 60 is carried by the shaft 20 and the counterweight 61 is carried by the shaft 21.

Each of the counterweights 58 and 59 has a downwardly projecting guide pin 62 which may be received in a bore in the counterweight by a drive fit. Each of the counterweights 60 and 61 has a bore 63 in which is disposed a bushing 64. An anti-friction bearing 65 is disposed within each of the bushings 64. The pin 62 of each of the upper counterweights 58 and 59 enters the bearing 65 of the corresponding lower counterweight 60 or 61 to be guided therein for vertical oscillatory movement. Thus the upper and lower counterweights are mounted in pairs with the cooperating counterweights of each pair guiding each other so as to maintain fixed orientation while being cyclically orbitally movable through rotation of the shafts on which they are mounted.

The heads 41 and 42 are positioned outside the frame member 3 and the counterweights 58, 59, 60 and 61 are positioned inside the frame member 3, that is to say, at the opposite face of that frame member from the heads. The distance between the outer face of the frame member 3 and the outboard bearings 40 is only slightly greater than the axial dimension of the heads. This makes for an extremely strong and rugged structure capable of doing heavy work at high speeds. The counterweights effectively perform their function although mounted on shafts other than the shafts upon which the heads are mounted. Being positioned within the frame 2 the counterweights do not affect the distance of projection out of the frame of the head-carrying shafts 10, 11, 12 and 13. The counterweight shafts are laterally offset from the heads, i. e., they are positioned so that they are not covered by the heads. They are easily accessible and it is necessary only to remove the removable bearings 49 to enable adjustment of the counterweight eccentrics.

The counterweight eccentrics are positioned relatively to the eccentrics for operating the heads so that the counterweights are disposed at about 180° angularly of the shafts from the heads. The two counterweights 58 and 59 counterbalance the head 41 laterally, i. e., in the right and left direction viewing Figure 1, and the two counterweights 60 and 61 similarly counterbalance the head 42. The counterweights are not needed for vertical counterbalancing as the heads counterbalance each other in the vertical direction. Likewise the counterweights 58 and 60 counterbalance each other in the vertical direction and the counterweights 59 and 61 counterbalance each other in the vertical direction.

The structure shown in Figure 3 is the same as that shown in Figures 1 and 2 except that in place of the two upper counterweights 58 and 59 of Figures 1 and 2 there is provided a single upper counterweight 66 and in place of the two lower counterweights 60 and 61 of Figures 1 and 2 there is provided a single lower counterweight 67. Each of the counterweights 66 and 67 is of generally U shape. Since these two counterweights are identical description of one will suffice for both. The counterweight 66 has a central or body portion 68 with two projecting arms 69 so that it is of somewhat U shape when viewed in elevation from the front of the machine. Each of the arms 69 is carried upon one of the shafts 25 and 26 by eccentric mechanism which is the same as that shown in Figures 1 and 2 and described in detail above. Since each of the counterweights 66 and 67 is mounted upon two counterweight shafts it will automatically maintain its orientation and no means for preventing it from turning is needed. Thus in the structure shown in Figure 3 it is not necessary to use the pin and socket guiding means of Figures 1 and 2. The structure of Figure 3 has all the advantages of the structure of Figures 1 and 2 and the added advantage that it is adapted for heavier work since the mass of each of the counterweights 66 and 67 is much greater than the masses of the smaller counterweights of Figures 1 and 2. By the same token a structure of the type shown in Figures 1 and 2 will ordinarily be employed when relatively light work is to be done.

While I have shown and described certain present preferred embodiments of the invention it is to be distinctly understood that the invention is not limited thereto but may be otherwise variously embodied within the scope of the following claims.

I claim:

1. A forming machine comprising a plurality of parallel rotary shafts whose axes are fixed, eccentric means thereon, a head mounted on at least one of said shafts and operated by the eccentric means thereon to move cyclically upon rotation of said shafts and a counterweight mounted on at least one of said shafts other than the shaft or shafts carrying the head and operated by the eccentric means thereon to move cyclically upon rotation of said shafts.

2. A forming machine comprising a plurality of parallel rotary shafts, eccentric means thereon, a head mounted on a plurality but less than all of said shafts and operated by the eccentric means thereon to move cyclically upon rotation of said shafts and a counterweight mounted on at least one of said shafts other than the shafts carrying the head and operated by the eccentric means thereon to move cyclically upon rotation of said shafts.

3. A forming machine comprising a plurality of parallel rotary shafts, eccentric means thereon, a head mounted on a plurality but less than all of said shafts and operated by the eccentric means thereon to move cyclically upon rotation of said shafts and a counterweight mounted on one only of said shafts other than the shafts carrying the head and operated by the eccentric means thereon to move cyclically upon rotation of said shafts.

4. A forming machine comprising a plurality of parallel rotary shafts, eccentric means thereon, a head mounted on at least one of said shafts and operated by the eccentric means thereon to move cyclically upon rotation of said shafts and a counterweight mounted on one only of said shafts other than the shaft or shafts carrying the head and operated by the eccentric means thereon to move cyclically upon rotation of said shafts.

5. A forming machine comprising a plurality of parallel rotary shafts whose axes are fixed, eccentric means thereon, a head mounted on at least one of said shafts and operated by the eccentric means thereon to move cyclically upon rotation of said shafts and a counterweight mounted on a plurality of said shafts other than the shaft or shafts carrying the head and operated by the eccentric means thereon to move cyclically upon rotation of said shafts.

6. A forming machine comprising a plurality of parallel rotary shafts, eccentric means thereon, a head mounted on a plurality but less than all of said shafts and operated by the eccentric means thereon to move cyclically upon rotation of said shafts and a counterweight mounted on a plurality of said shafts other than the shafts carrying the head and operated by the eccentric means thereon to move cyclically upon rotation of said shafts.

7. A forming machine comprising a plurality of parallel rotary shafts, eccentric means thereon, a head mounted on at least one of said shafts and operated by the eccentric means thereon to move cyclically upon rotation of said shafts, a counterweight mounted on one only of said shafts other than the shaft or shafts carrying the head and operated by the eccentric means thereon to move cyclically upon rotation of said shafts and means for restraining said counterweight against turning.

8. A forming machine comprising a plurality of parallel rotary shafts, eccentric means thereon, a head mounted on a plurality but less than all of said shafts and operated by the eccentric means thereon to move cyclically upon rotation of said shafts, a counterweight mounted on one only of said shafts other than the shafts carrying the head and operated by the eccentric means thereon to move cyclically upon rotation of said shafts and means for restraining said counterweight against turning.

9. A forming machine comprising opposed heads for operating on work positioned therebetween and which relatively move toward and away from each other and when closest together move laterally generally in the same direction, a plurality of parallel shafts on which one of the heads is mounted, eccentric means on said shafts carrying said head to impart the desired movement to said head upon rotation of said shafts, other shaft means parallel to said plurality of parallel shafts, a counterweight mounted on said other shaft means and eccentric means on said other shaft means carrying said counterweight.

10. A forming machine comprising opposed sets of parallel shafts, eccentric means on said shafts, opposed heads, each mounted on less than all of the shafts of one set and carried by the eccentric means thereon so that upon rotation of said shafts said heads move toward and away from each other and when closest together move laterally generally in the same direction, and opposed counterweights respectively mounted on shaft means of the respective sets of parallel shafts other than the shafts on which the heads are mounted and carried by the eccentric means thereon.

11. A forming machine comprising opposed heads for operating on work positioned therebetween and which relatively move toward and away from each other and when closest together move laterally generally in the same direction, a supporting structure, three parallel shafts rotatable at the same speed supported by said supporting structure, one of said heads being mounted on two of said shafts, eccentric means on said two shafts carrying said head to impart the desired movement to said head upon rotation of said shafts, a counterweight mounted on the third shaft, eccentric means on said third shaft carrying said counterweight, the eccentric means on said shafts carrying said head having their high points disposed at positions on said shafts relatively to the position of the high point of the eccentric means on said third shaft carrying said counterweight such that when said head is in one extreme lateral position said counterweight is in approximately the opposite extreme lateral position, and means for restraining said counterweight against turning.

12. A forming machine comprising a supporting structure, opposed sets of parallel shafts supported by said supporting structure, eccentric means on said shafts, opposed heads mounted respectively on less than all of the shafts of the respective sets and carried by the eccentric means thereon so that upon rotation of said shafts said heads move toward and away from each other and when closest together move laterally generally in the same direction, opposed counterweights mounted respectively on single shafts of the respective sets other than the shafts on which the heads are mounted, the eccentric means on the head-carrying shafts of each set having their high points disposed at positions on said shafts relatively to the position of the high point of the eccentric means on the counterweight-carrying shaft of the same set such that when said head is in one extreme lateral position said counterweight is in approximately the opposite extreme lateral position, and means for restraining said counterweights against turning.

13. A forming machine comprising a supporting structure, opposed sets of parallel shafts supported by said supporting structure, eccentric means on said shafts, opposed heads mounted respectively on less than all of the shafts of the respective sets and carried by the eccentric means thereon so that upon rotation of said shafts said heads move toward and away from each other and when closest together move laterally generally in the same direction, opposed counterweights mounted respectively on single shafts of the respective sets other than the shafts on which the heads are mounted, the eccentric means on the head-carrying shafts of each set having their high points disposed at positions on said shafts relatively to the position of the high point of the eccentric means on the counterweight-carrying shaft of the same set such that when said head is in one extreme lateral position said counterweight is in approximately the opposite extreme lateral position, and guide means for said counterweights acting therebetween permitting relative movement of the counterweights toward and away from each other but maintaining their orientation.

14. A forming machine comprising a supporting structure, opposed sets of parallel shafts supported by said supporting structure, eccentric means on said shafts, opposed heads mounted respectively on less than all of the shafts of the respective sets and carried by the eccentric means thereon so that upon rotation of said shafts said heads move toward and away from each other and when closest together move laterally generally in the same direction, opposed counterweights mounted respectively on single shafts of the respective sets other than the shafts on which the heads are mounted, the eccentric means on the head-carrying shafts of each set having their high points disposed at positions on said shafts relatively to the position of the high point of the eccentric means on the counterweight-carrying shaft of the same set such that when said head is in one extreme lateral position said counterweight is in approximately the opposite extreme lateral position, and a guide sleeve connected with one of the counterweights receiving a projecting portion of the other counterweight permitting relative movement of the counterweights toward and away from each other but maintaining their orientation.

15. A forming machine comprising a supporting structure, two sets of three shafts each mounted in said supporting structure, all of said shafts being parallel to one another and rotating at the same speed, the shafts being arranged so that the axes of two shafts of one set lie in a plane parallel to a plane containing the axes of two shafts of the other set, eccentric means on said shafts, opposed heads respectively mounted on said two shafts of the respective sets and carried by the eccentric means thereon so that upon rotation of said shafts said heads move toward and away from each other and when closest together move laterally generally in the same direction, opposed counterweights respectively mounted on the third shaft of the respective sets and carried by the eccentric means thereon, the eccentric means on the head-carrying shafts of each set having their high points disposed at positions on said shafts relatively to the position of the high point of the eccentric means on the counterweight-carrying shaft of the same set such that when said head is in one extreme lateral position said counterweight is in approximately the opposite extreme lateral position, and means for restraining said counterweights against turning, the eccentric means on the shafts of the respective sets being relatively disposed so that both heads are in the same extreme lateral position at substantially the same time.

16. A forming machine comprising opposed heads for operating on work positioned therebetween and which relatively move toward and away from each other and when closest together move laterally generally in the same direction, a supporting structure, at least four parallel shafts rotatable at the same speed supported by said supporting structure, one of said heads being mounted on at least two of said shafts, eccentric means on said two shafts carrying said head to impart the desired movement to said head upon rotation of said shafts, a counterweight mounted on at least two of said shafts other than those upon which said head is mounted and eccentric means on the counterweight-carrying shafts, the eccentric means on the head-carrying shafts having their high points disposed at positions on said shafts relatively to the positions of the high points of the eccentric means on the counterweight-carrying shafts such that when said head is in one extreme lateral position said counterwegiht is in approximately the opposite extreme lateral position.

17. A forming machine comprising a plurality of parallel rotary shafts, eccentric means thereon, a head mounted on at least one of said shafts and operated by the eccentric means thereon to move cyclically toward and from a cooperating head upon rotation of said shafts and two counterweights each mounted on at least one of said shafts other than the shaft or shafts carrying the head and operated by the eccentric means thereon to move cyclically upon rotation of said shafts, the eccentric means for operating the head and the eccentric means for operating the counterweights being relatively disposed so that when the head is in one extreme lateral position both counterweights are in the opposite extreme lateral position.

18. A forming machine comprising a frame member, shaft means journaled in the frame member, eccentric means carried by the shaft means at one side of the frame member, a head mounted on the shaft means and operated by the eccentric means thereon to move cyclically, other shaft means parallel to the first mentioned shaft means and geared thereto, eccentric means carried by the last mentioned shaft means at the opposite side of the frame member and a counterweight mounted on the last mentioned shaft means and operated by the eccentric means thereon.

19. A forming machine comprising a frame member, shaft means journaled in the frame member, eccentric means carried by the shaft means at one side of the frame member, a head mounted on the shaft means and operated by the eccentric means thereon to move cyclically, other shaft means parallel to the first mentioned shaft means and geared thereto, adjustable eccentric means carried by the last mentioned shaft means at the opposite side of the frame member, said last mentioned eccentric means being offset laterally from the head so as to be readily accessible for adjustment, and a counterweight mounted on the last mentioned shaft means and operated by the eccentric means thereon.

20. A forming machine comprising a frame member, shaft means journaled in the frame member, eccentric means carried by the shaft means at one side of the frame member, a head mounted on the shaft means and operated by the eccentric means thereon to move cyclically, other shaft means parallel to the first mentioned shaft means and geared thereto, said other shaft means also being journaled in the frame member, adjustable eccentric means carried by the last mentioned shaft means at the opposite side of the frame member, said last mentioned eccentric means being offset laterally from the head, and a counterweight mounted on the last mentioned shaft means and operated by the eccentric means thereon, the frame member having a portion which is removable to permit ready access to the last mentioned eccentric means so that the same may be adjusted through the frame member.

21. In a forming machine, shaft means, eccentric means carried by the shaft means, a working head mounted on the shaft means movable cyclically by the eccentric means upon rotation of the shaft means, other shaft means having a fixed axis or fixed axes generally parallel to the first mentioned shaft means but offset laterally from the working head, the second mentioned shaft means being operatively connected with the first mentioned shaft means to rotate when the first mentioned shaft means rotate, eccentric means carried by the second mentioned shaft means, and a counterweight mounted on the second mentioned shaft means movable cyclically by the eccentric means carried by the second mentioned shaft means upon rotation of the shaft means.

22. In a forming machine, a frame member, shaft means journaled in the frame member, eccentric means carried by the shaft means at one side of the frame member, a working head mounted on the shaft means movable cyclically by the eccentric means upon rotation of the shaft means, other shaft means generally parallel to the first mentioned shaft means but offset laterally from the working head, the second mentioned shaft means also being journaled in the frame member, and being operatively connected with the first mentioned shaft means to rotate when the first mentioned shaft means rotate, eccentric means carried by the second mentioned shaft means at the opposite side of the frame member and a counterweight mounted on the second mentioned shaft means movable cyclically by the eccentric means carried by the second mentioned shaft means upon rotation of the shaft means.

23. In a forming machine, a frame member, shaft means journaled in the frame member, eccentric means carried by the shaft means at one side of the frame member, a working head mounted on the shaft means movable cyclically by the eccentric means upon rotation of the shaft means, other shaft means generally parallel to the first mentioned shaft means but offset laterally from the working head, bearing means carried by the frame member and removable therefrom toward said side thereof in a direction generally parallel to the shaft means, the second mentioned shaft means being journaled in said bearing means and projecting from said bearing means toward the opposite side of the frame member, the second mentioned shaft means being operatively connected with the first mentioned shaft means to rotate when the first mentioned shaft means rotate, eccentric means carried by the second mentioned shaft means at said opposite side of the frame member and being adjustable or replaceable on the second mentioned shaft means upon removal of said bearing means and a counterweight mounted on the second mentioned shaft means movable cyclically by the eccentric means carried by the second mentioned shaft means upon rotation of the shaft means.

24. In a forming machine, a frame member, shaft means journaled in the frame member, eccentric means carried by the shaft means at one side of the frame member, a working head mounted on the shaft means movable cyclically by the eccentric means upon rotation of the shaft means, other shaft means generally parallel to the first mentioned shaft means but offset laterally from the working head, the frame member having an opening or openings therethrough, bearing means carried by the frame member normally positioned in said opening or openings, fastened in place from said side of the frame member and removable from the frame member toward said side thereof, the second mentioned shaft means being journaled in said bearing means and projecting from said bearing means toward the opposite side of the frame member, the second mentioned shaft means being operatively connected with the first mentioned shaft means to rotate when the first mentioned shaft means rotate, eccentric means carried by the second mentioned shaft means at said opposite side of the frame member and being adjustable or replaceable on the second mentioned shaft means through said opening or openings upon removal of said bearing means and a counterweight mounted on the second mentioned shaft means movable cyclically by the eccentric means carried by the second mentioned shaft means upon rotation of the shaft means.

25. In a forming machine, shaft means, eccentric means carried by the shaft means, a head mounted on the shaft means movable cyclically by the eccentric means upon rotation of the shaft means, two counterweight shafts having fixed axes generally parallel to said shaft means but offset laterally from the head, the counterweight shafts being operatively connected with said shaft means to rotate when said shaft means rotate, eccentric means carried by the counterweight shafts and a counterweight mounted on the counterweight shafts movable cyclically by the eccentric means carried by the counterweight shafts upon rotation thereof.

26. In a forming machine, shaft means, eccentric means carried by the shaft means, a head mounted on the shaft means movable cyclically by the eccentric means upon rotation of the shaft means, two counterweight shafts generally parallel to said shaft means but offset laterally from the head, the counterweight shafts being operatively connected with said shaft means to rotate when said shaft means rotate, eccentric means carried by the counterweight shafts, separate counterweights mounted on the respective counterweight shafts movable cyclically by the eccentric means carried by the counterweight shafts upon rotation thereof and means restraining the counterweights against turning.

27. In a forming machine, opposed shaft means, eccentric means carried by the shaft means, opposed heads mounted respectively on the opposed shaft means movable cyclically by the eccentric means upon rotation of the shaft means, other opposed shaft means generally parallel to the first mentioned shaft means but offset laterally from the heads, the second mentioned shaft means being operatively connected with the first mentioned shaft means to rotate when the first mentioned shaft means rotate, eccentric means carried by the second mentioned shaft means and opposed counterweights mounted respectively on the opposed second mentioned shaft means movable cyclically by the eccentric means carried by the second mentioned shaft means upon rotation thereof.

28. In a forming machine, opposed shaft means, eccentric means carried by the shaft means, opposed heads mounted respectively on the opposed shaft means movable cyclically by the eccentric means upon rotation of the shaft means, opposed sets of counterweight shafts generally parallel to said shaft means, the counterweight shafts being offset laterally from the heads, the counterweight shafts being operatively connected with said shaft means to rotate when said shaft means rotate, eccentric means carried by the counterweight shafts and opposed counterweights mounted respectively on the opposed sets of counterweight shafts movable cyclically by the eccentric means carried by the counterweight shafts upon rotation thereof.

29. In a forming machine, opposed shaft means, eccentric means carried by the shaft means, opposed heads mounted respectively on the opposed shaft means movable cyclically by the eccentric means upon rotation of the shaft means, opposed sets of counterweight shafts generally parallel to said shaft means, the counterweight shafts being offset laterally from the heads, the counterweight shafts being operatively connected with said shaft means to rotate when said shaft means rotate, eccentric means carried by the counterweight shafts and opposed counterweights each mounted on the shafts of one of the opposed sets of counterweight shafts movable cyclically by the eccentric means carried by the counterweight shafts upon rotation thereof.

30. In a forming machine, opposed shaft means, eccentric means carried by the shaft means, opposed heads mounted respectively on the opposed shaft means movable cyclically by the eccentric means upon rotation of the shaft means, opposed sets of counterweight shafts generally parallel to said shaft means, the counterweight shafts being offset laterally from the heads, the counterweight shafts being operatively connected with said shaft means to rotate when said shaft means rotate, eccentric means carried by the counterweight shafts and opposed sets of counterweights arranged in opposed pairs mounted respectively on the opposed sets of counterweight shafts movable cyclically by the eccentric means carried by the counterweight shafts upon rotation thereof, the counterweights of each opposed pair being guided relatively to each other so that their orientation remains substantially fixed.

GUY O. CONNER.

REFERENCES CITED

The following references are of record in the file of this patent:

UNITED STATES PATENTS

| Number | Name | Date |
| --- | --- | --- |
| 2,183,467 | Sarazin | Dec. 12, 1939 |